(12) United States Patent
Larsson et al.

(10) Patent No.: US 12,410,840 B2
(45) Date of Patent: Sep. 9, 2025

(54) VEHICLE ENERGY MANAGEMENT SYSTEM, VEHICLE COMPRISING SUCH VEHICLE ENERGY MANAGEMENT SYSTEM, AND METHOD OF CONTROLLING VEHICLE ENERGY MANAGEMENT SYSTEM

(71) Applicant: Volvo Truck Corporation, Gothenburg (SE)

(72) Inventors: Fredrik Larsson, Vellinge (SE); Tove Audhav, Landvetter (SE); Fredrik Rahm, Hörby (SE)

(73) Assignee: Volvo Truck Corporation, Gothenburg (SE)

( * ) Notice: Subject to any disclaimer, the term of this patent is extended or adjusted under 35 U.S.C. 154(b) by 308 days.

(21) Appl. No.: 17/949,326

(22) Filed: Sep. 21, 2022

(65) Prior Publication Data
US 2023/0102528 A1  Mar. 30, 2023

(30) Foreign Application Priority Data
Sep. 28, 2021 (EP) .................................... 21199481

(51) Int. Cl.
*F16D 61/00* (2006.01)
*B60H 1/00* (2006.01)
*B60T 1/10* (2006.01)

(52) U.S. Cl.
CPC ................ *F16D 61/00* (2013.01); *B60T 1/10* (2013.01); *B60H 2001/003* (2013.01); *B60T 2270/60* (2013.01)

(58) Field of Classification Search
CPC ........ F16D 61/00; B60T 1/10; B60T 2270/60; B60T 17/02; B60H 2001/003; B60K 11/06; B60L 1/02; B60L 7/22; B60W 2510/244
See application file for complete search history.

(56) References Cited

U.S. PATENT DOCUMENTS

| | | |
|---|---|---|
| 2007/0057564 A1 | 3/2007 | Colling |
| 2008/0174174 A1 | 7/2008 | Burns et al. |
| 2016/0325598 A1 | 11/2016 | Schumann et al. |

(Continued)

FOREIGN PATENT DOCUMENTS

| | | |
|---|---|---|
| CN | 1727814 A | 2/2006 |
| CN | 1950223 A | 4/2007 |
| CN | 105799520 A | 7/2016 |

(Continued)

OTHER PUBLICATIONS

Machine Translation of WO 2020074083 A1 PDF File Name: "WO2020074083A1_Machine_Translation.pdf" (Year: 2020).*

(Continued)

*Primary Examiner* — Lindsay M Low
*Assistant Examiner* — Ruben Picon-Feliciano
(74) *Attorney, Agent, or Firm* — Withrow & Terranova, PLLC (57) ABSTRACT

A vehicle energy management system connectable to a vehicle and configured to control a valve arrangement to deliver a flow of pressurized air to a heat receiving structure when the vehicle is operated in a vehicle braking mode and a temperature level of the heat receiving structure is below a maximum limit of a predetermined temperature range.

15 Claims, 4 Drawing Sheets

(56) References Cited

U.S. PATENT DOCUMENTS

2017/0106717 A1    4/2017  Mitani et al.
2020/0263681 A1*   8/2020  Hoff ..................... F04B 35/002

FOREIGN PATENT DOCUMENTS

| CN | 109244601 A | 1/2019 | |
|---|---|---|---|
| CN | 110816199 A | 2/2020 | |
| CN | 112606694 A | 4/2021 | |
| CN | 112721569 A | 4/2021 | |
| WO | 2011148051 | 12/2011 | |
| WO | 2015011495 A1 | 1/2015 | |
| WO | WO-2020074083 A1 * | 4/2020 | ......... B60G 17/0408 |

OTHER PUBLICATIONS

Extended European Search Report for European Patent Application No. 21199481.9, mailed Mar. 21, 2022, 8 pages.
First Office Action for Chinese Patent Application No. 202211175105.1, mailed Mar. 11, 2025, 12 pages.
Notification to Grant for Chinese Patent Application No. 202211175105.1, mailed Jul. 9, 2025, 6 pages.

* cited by examiner

VEHICLE ENERGY MANAGEMENT SYSTEM, VEHICLE COMPRISING SUCH VEHICLE ENERGY MANAGEMENT SYSTEM, AND METHOD OF CONTROLLING VEHICLE ENERGY MANAGEMENT SYSTEM

RELATED APPLICATIONS

The present application claims priority to European Patent Application No. 21199481.9, filed on Sep. 28, 2021, and entitled "VEHICLE ENERGY MANAGEMENT SYSTEM, VEHICLE COMPRISING SUCH VEHICLE ENERGY MANAGEMENT SYSTEM, AND METHOD OF CONTROLLING VEHICLE ENERGY MANAGEMENT SYSTEM," which is incorporated herein by reference in its entirety.

TECHNICAL FIELD

The present invention relates to a vehicle energy management system for a vehicle at least partially propelled by an electric traction motor. The present invention also relates to a vehicle comprising such a vehicle energy management system, and a method of controlling a vehicle energy management system. Although the invention will mainly be directed to a vehicle in the form of a truck, the invention may also be applicable for other types of vehicles such as e.g., buses, working machines, and other transportation vehicles.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric traction motor conventionally struggles with obtaining functionalities often handled by an ICE. For example, an ICE generates warm exhaust gas which can be used to heat various auxiliary components of the vehicle. An electric traction motor on the other hand does not generate heat to the same extent as an ICE. Vehicles propelled by electric traction motors thus struggles with the problem of providing sufficient heat for its auxiliary components. There is thus a desire to provide a vehicle energy management system for a vehicle which is at least partially propelled by an electric traction motor, which energy management system enables for the provision of heating various components of the vehicle.

SUMMARY

It is thus an object of the present invention to at least partially overcome the above described deficiencies.

According to a first aspect, there is provided a vehicle energy management system connectable to a vehicle, the energy management system comprising a heat receiving structure susceptible to a flow of pressurized air; an air compressor, arranged in fluid communication with an ambient environment via a first conduit, and in fluid communication with the heat receiving structure via a second conduit; a valve arrangement arranged in downstream fluid communication with the air compressor, the valve arrangement being configured controllably deliver a flow of pressurized air from the air compressor to the ambient environment via the first conduit and/or to the heat receiving structure via the second conduit; and a control unit connected to the air compressor and the valve arrangement, the control unit comprising control circuitry configured to receive a signal indicative of a current vehicle operating mode for the vehicle, the vehicle operating mode being one of a vehicle braking mode in which the vehicle is controlled not to exceed a desired vehicle speed, and a vehicle non-braking mode; receive a signal indicative of a temperature level of the heat receiving structure; compare the temperature level with a predetermined temperature range; and when the vehicle is operated in the vehicle braking mode and the temperature level is below a maximum limit of the predetermined temperature range: control the air compressor to supply a flow of pressurized air towards the valve arrangement; and control the valve arrangement to deliver the flow of pressured air to the heat receiving structure via the second conduit.

The wording "vehicle braking mode" should be construed as an operating condition of the vehicle when the vehicle is reducing the vehicle speed, or when the vehicle is braking for maintaining a desired vehicle speed. The latter case may, for example, be an operating condition where the vehicle is driving at a downhill slope and there is a desire to maintain a desired steady vehicle speed. If not braking in such situation, the downhill slope will make the vehicle increase its vehicle speed. The vehicle braking mode is preferably a mode at which auxiliary braking is performed. The vehicle energy management system can thus advantageously form part of a vehicle auxiliary braking system, where the air compressor, in the vehicle braking mode, is operated by electric energy generated during auxiliary braking.

Further, when the vehicle is operated in the vehicle braking, it should be understood that the vehicle energy management system dissipates energy and is thus not necessarily dependent on speed of the vehicle. The energy dissipation of the vehicle energy management system could be obtained by an adjustment of the State-of-Charge of a battery to have sufficient brake power, etc.

The "vehicle non-braking mode" should thus be construed as a mode in which the vehicle energy management system is not dissipating energy obtained due to braking. In the vehicle non-braking mode, the energy can instead be dissipated by e.g. at least partly draining a battery, or operating a fuel cell, etc. to generate electric power to, for example, the air compressor. Thus, the vehicle non-braking mode can be obtained when the vehicle is at stand-still, or when the vehicle is operated under propulsion, etc. Hence, the vehicle non-braking mode and the vehicle braking mode are antagonistic operating modes. The vehicle non-braking mode and the vehicle braking mode could be determined by the control unit receiving a signal from e.g. an upper layer control system of the vehicle, etc. The upper layer control system thus determines that the vehicle is currently in one of the modes and transmits a signal to the control unit with information of the current operating mode.

Furthermore, it should be readily understood that the temperature level of the heat receiving structure may be received from e.g. a temperature sensor of the heat receiving structure. The temperature level may however be determined by other means than a temperature sensor. For example, the vehicle may comprise a virtual sensor which determines or estimates the temperature level of the heat receiving structure from map data. In addition to map data, the virtual sensor can receive a signal indicative of the ambient environment to estimate the temperature level of the heat receiving structure.

Also, and according to an example embodiment, the heat receiving structure may be at least one of a vehicle trailer body, a vehicle cab, a vehicle energy storage system, and a vehicle fuel cell system.

Moreover, the air compressor should be construed as a device or arrangement which is able to produce a flow of air to the first conduit. The air supplied from the air compressor should preferably be pressurized and provided with an increased temperature level compared to the temperature level of the air entering the air compressor. The air compressor may thus pressurize and heat the air to various levels depending on the application of use. Hence, the air compressor could thus be formed by an air fan.

The present invention is based on the insight that during a vehicle braking mode, the generated electric energy can efficiently be dissipated as heat by using the air compressor. The air compressor thus dissipates electric energy to pressurize and heat air. An advantage is thus that heating of the heat receiving structure is provided as much as possible when having access to "free energy" generated during the vehicle braking mode. The heat receiving structure is thus in this operating mode heated as much as possible without exceeding the maximum limit of the predetermined temperature range. Hereby, the heat receiving structure is heated without exceeding a maximum limit in which the heat receiving structure could potentially be damaged due to excessive temperature exposure. By heating the heat receiving structure as much as possible during the vehicle braking mode, a buffer of heat is provided to the heat receiving structure for upcoming operating condition where the vehicle is not assuming the vehicle braking mode.

During the vehicle braking mode, the power of the air compressor is preferably controlled based on the braking performed. Thus, the flow of heated air from the air compressor to the heat receiving structure is dependent on the present braking action performed.

Furthermore, the present invention enables for flowing and heating relatively large amount of air without using fossil fuel, thereby providing for an environmentally friendly vehicle energy management system. Also, the vehicle energy management system can be designed in a compact manner, thereby making it flexible and versatile, and usable on various positions of the vehicle.

According to an example embodiment, the control circuitry may be further configured to control the valve arrangement to deliver the flow of pressurized air to the ambient environment via the first conduit when the vehicle is operated in the vehicle braking mode and the temperature level is above the maximum limit of the predetermined temperature range.

Hereby, when the temperature level of the heat receiving structure is at the maximum limit of the predetermined temperature range, the pressurized flow of air is directed to the ambient environment. An advantage is thus that the heat receiving structure is protected from overheating and the non-pollutant air is instead directed to the ambient environment.

According to an example embodiment, the control circuitry may, when the vehicle is operated in the vehicle non-braking mode and the temperature level is below a lower limit of the predetermined temperature range, be further configured to control the air compressor to supply a flow of pressurized air towards the valve arrangement; and control the valve arrangement to deliver the flow of pressurized air to the heat receiving structure.

Hereby, the compressor is controlled to supply a flow of pressurized air such that the temperature level of the heat receiving structure exceeds the lower limit of the predetermined temperature range. It is hereby ensured that the heat receiving structure is kept at a sufficient temperature level even if the vehicle is not operated in the vehicle braking mode. In further detail, when the temperature level is below the lower limit of the predetermined temperature range and the vehicle is operated in the non-braking mode, the heat receiving structure is heated as little as possible. The air compressor is hereby controlled to supply a sufficient amount of heat to the heat receiving structure. Accordingly, and according to an example embodiment, the air compressor may be controlled based on a difference between the temperature level of the heat receiving structure and the lower limit of the predetermined temperature range when the vehicle is operated in the vehicle non-braking mode and the temperature level is below a lower limit of the predetermined temperature range.

According to an example embodiment, the control circuitry may be further configured to inhibit operation of the air compressor when the vehicle is operated in the vehicle non-braking mode and the temperature level exceeds the lower limit of the predetermined temperature range. Hence, if the temperature level of the heat receiving structure is within acceptable limits, the air compressor is inhibited from operation when the vehicle is operated in the vehicle non-braking mode.

According to an example embodiment, the control circuitry may be further configured to receive an operator based signal indicative of non-heating operation of the heat receiving structure; and upon receiving said signal; and inhibit operation of the air compressor when the vehicle is operated in the vehicle non-braking mode.

An advantage is that the operator of the vehicle can decide to not heat the heat receiving structure. A reason for such decision may, for example, be that the operator is aware of an upcoming condition for the vehicle in which the vehicle will be operated in the vehicle braking mode, etc.

According to an example embodiment, the heat receiving structure may be a first heat receiving structure, the energy management system further comprising a second heat receiving structure different from the first heat receiving structure, the second heat receiving structure being arranged in downstream fluid communication with the valve arrangement via a third conduit. Hence, the air compressor may supply heated air to more than one heat receiving structure. According to an example embodiment, the first and second heat receiving structures may be arranged in parallel with each other.

According to an example embodiment, the control circuitry may be further configured to determine a first desired temperature level of the first heat receiving structure; determine a first temperature deviation of the first heat receiving structure, the first temperature deviation being indicative of a current temperature level below the first desired temperature level; receive a signal indicative of a temperature level of the second heat receiving structure; determine a second desired temperature level of the second heat receiving structure; determine a second temperature deviation of the second heat receiving structure, the second temperature deviation being indicative of a current temperature level below the second desired temperature level; compare the first temperature deviation with the second temperature deviation; control the valve arrangement to direct the flow of pressurized air to the first heat receiving structure when the first temperature deviation is larger than the second temperature deviation, and control the valve arrangement to direct the flow of pressurized air to the second heat receiving structure when the second temperature deviation is larger than the first temperature deviation.

The signal indicative of the temperature limit of the second heat receiving structure may be received from a second temperature sensor arranged to determined/sense the current temperature of the second heat receiving structure. However, and in a similar vein as described above, the temperature limit of the second heat receiving structure may as an alternative be received from a second virtual sensor which determines or estimates the temperature level of the second heat receiving structure from map data.

The first and second desired temperature levels are preferably individually controlled, i.e. they are dependent on the specific structure of the heat receiving structure. In further detail, the first desired temperature level may be lower than the second desired temperature level, or vice versa. The control unit can hereby direct the flow of pressurized air to the component in most need of heating, even if that component is warmer than the other component. The control unit can thus prioritize heating in an efficient manner.

According to an example embodiment, the control circuitry may be further configured to: receive a signal indicative of an air flow temperature of the flow of pressurized air supplied from the air compressor at a position upstream the valve arrangement; and control the valve arrangement to direct the flow of pressurized air to the first heat receiving structure or to the second heat receiving structure based on the air flow temperature of the flow of pressurized air, the temperature level of the first heat receiving structure, and the temperature level of the second heat receiving structure.

Hereby, the control unit can prioritize the flow direction to the component in most need of heating. It should be understood that the valve arrangement can distribute the received flow of pressurized air to both the first and second heat receiving structures. Hence, a first portion of the pressurized flow of air can be supplied to the first heat receiving structure, and a second portion of the pressurized flow of air can be supplied to the second heat receiving structure.

According to an example embodiment, the vehicle energy management system may further comprise an electric machine connected to an electric source. According to an example embodiment, the air compressor may be connected to, and operable by, the electric machine. During the vehicle braking mode, the electric machine is operated by electric power generated by the auxiliary braking. The electric machine dissipates electric power by operating the air compressor. Hence, and according to an example embodiment, the control circuitry may be configured to control operation of the air compressor by controlling the electric machine. Preferably, the electric machine and the air compressor are mechanically connected to each other by means of e.g. a shaft connecting the rotator of the electric machine to a compressor shaft of the air compressor.

According to an example embodiment, the vehicle energy management system may further comprise an air heating arrangement in fluid communication between the air compressor and the valve arrangement. The air heating arrangement thus further heats the pressurized air supplied from the air compressor. According to an example embodiment, the air heating arrangement may be an electrical brake resistor connected to an electric source. An electric brake resistor can advantageously dissipate electric power during the vehicle braking mode as well as to heat the pressurized air supplied from the air compressor.

According to an example embodiment, the vehicle energy management system may further comprise a flow injecting arrangement in fluid communication between the air compressor and the valve arrangement. A flow injecting arrangement is a device which is able to either actively or passively admitting the flow of fluid into the flow of air downstream the air compressor. The flow of fluid could be either a gas, such as e.g. air, or a liquid, such as e.g. water. The flow injecting arrangement can thus comprise a pump or injector to supply the flow of fluid or be arranged with an opening or orifice admitting the flow of fluid by means of a pressure difference between an inlet side and on exterior of the flow injecting arrangement, i.e. a pressure difference between the outer ends of the opening/orifice.

According to an example embodiment, the flow injecting arrangement may be a venturi arrangement. The venturi arrangement may be either or both of a gas venturi arrangement and a liquid venturi. The venturi arrangement may comprise more than one venturi, such as two or more venturis arranged in series with each other.

According to a second aspect, there is provided a vehicle comprising a vehicle energy management system according to any one of the embodiments described above in relation to the first aspect.

Effects and features of the second aspect are largely analogous to those described above in relation to the first aspect.

According to a third aspect, there is provided a method of controlling a vehicle energy management system connected to a vehicle, the vehicle management system comprising a heat receiving structure susceptible to a flow of pressurized air; an air compressor, arranged in fluid communication with an ambient environment via a first conduit, and in fluid communication with the heat receiving structure via a second conduit; and a valve arrangement arranged in downstream fluid communication with the air compressor, the valve arrangement being configured to controllably deliver a flow of pressurized air from the air compressor to the ambient environment via the first conduit and/or to the heat receiving structure via the second conduit; wherein the method comprises determining a current vehicle operating mode for the vehicle, the vehicle operating mode being one of a vehicle braking mode in which the vehicle is controlled not to exceed a desired vehicle speed, and a vehicle non-braking mode; determining a temperature level of the heat receiving structure; comparing the temperature level with a predetermined temperature range; and when the vehicle is operated in the vehicle braking mode and the temperature level is below a maximum limit of the predetermined temperature range: controlling the air compressor to supply a flow of pressurized air towards the valve arrangement; and controlling the valve arrangement to deliver the flow of pressured air to the heat receiving structure via the second conduit.

Effects and features of the third aspect are largely analogous to those described above in relation to the first aspect.

According to a fourth aspect, there is provided a computer program comprising program code means for performing the steps of the above described third aspect when the program code means is run on a computer.

According to a fourth aspect, there is provided a computer readable medium carrying a computer program means for performing the steps of the above described third aspect when the program means is run on a computer.

Effects and features of the fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

Figure 1:
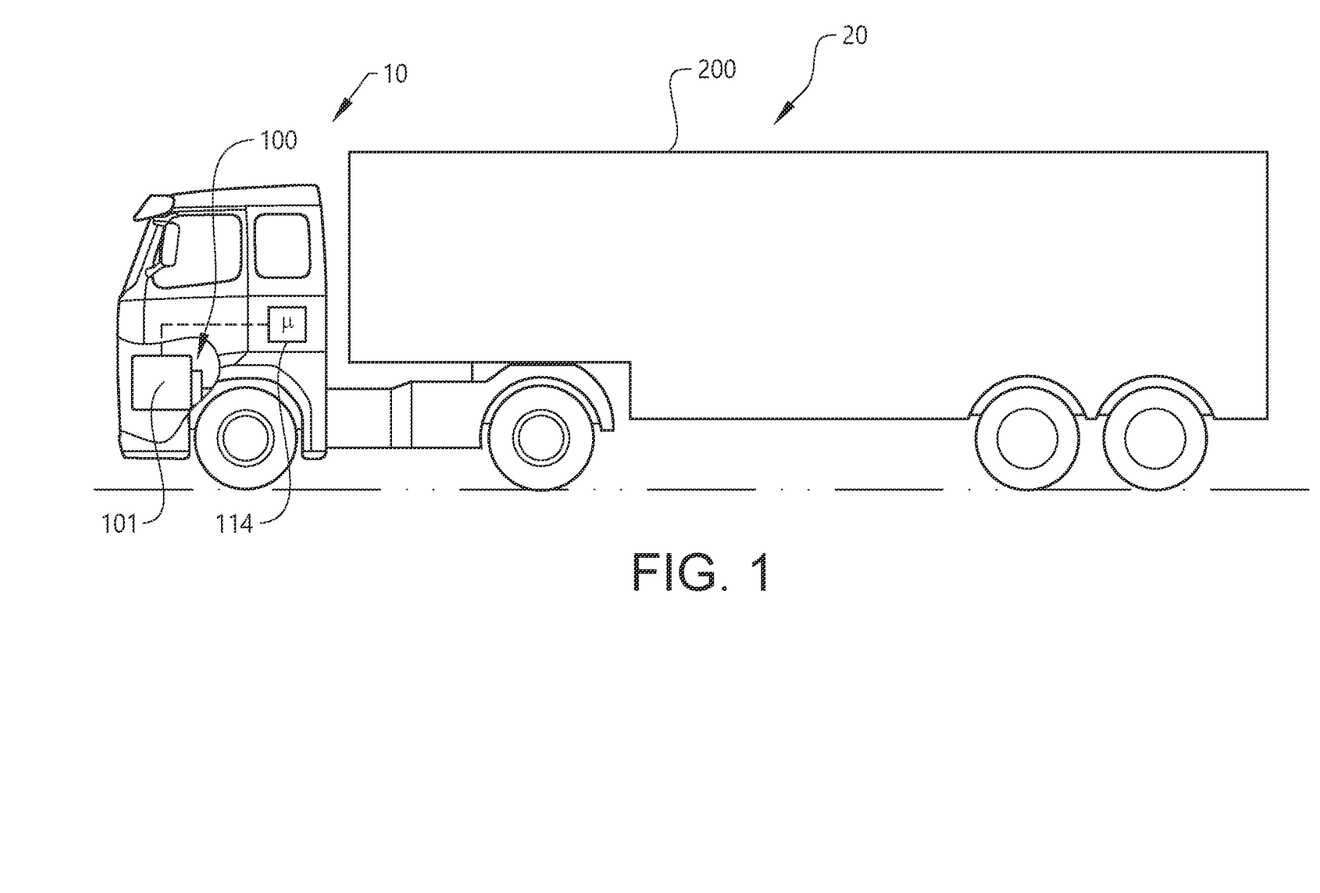
FIG. 1 is a lateral side view illustrating an example embodiment of a vehicle in the form of a truck.

With particular reference to FIG. 1, there is depicted a vehicle 10 in the form of a truck. The vehicle comprises a traction motor 101 for propelling the wheels of the vehicle. The traction motor 101 is in the example embodiment an electric machine arranged to receive electric power from an energy storage system, such as e.g. a battery or directly from a fuel cell system which is described in further detail below. The vehicle 10 also comprises a control unit 114 for controlling various operations as will also be described in further detail below, and a vehicle energy management system 100 (not shown in detail in FIG. 1) arranged to control heat distribution. As can be seen in FIG. 1, the vehicle further comprises trailer 20. The trailer comprises a heat receiving structure 200, in FIG. 1 schematically illustrated as a vehicle trailer body. The heat receiving structure 200 is thus arranged to receive heated air from the vehicle energy management system 100, as will be described in further detail below. It should be readily understood that other vehicle components fall within the scope of the heat receiving structure 200. For example, the heat receiving structure may be a vehicle box body, a vehicle cab, the vehicle energy storage system, such as the vehicle battery, a vehicle fuel cell system, etc. In summary, a component that should be arranged within a specific temperature range is a heat receiving structure according to this definition.

As a further example of the heat receiving structure 200, this component may be arranged in the form of a heat exchanger. In such a case, the heat exchanger receives air from the below valve arrangement 150. A liquid entering the heat exchanger can then be heated by the relatively warm air.

Although FIG. 1 illustrates a truck, other vehicles can be provided with the below described vehicle energy management system 100. For example, a working machine at least partly propelled by an electric traction motor is another vehicle which can advantageously incorporate the vehicle energy management system 100. In such a case, the heat receiving structure is, for example, the bucket or dump body of such a working machine.

Figure 2:
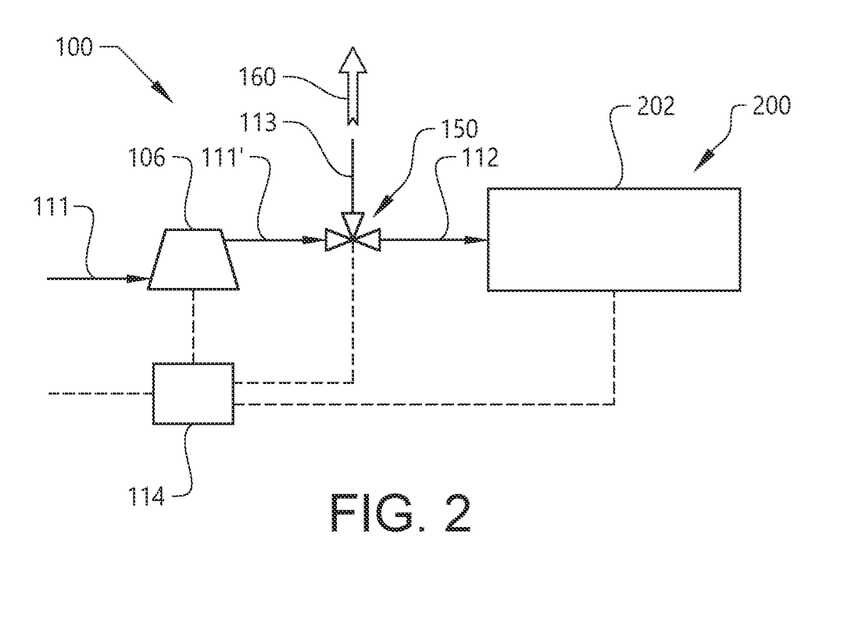
FIG. 2 is a schematic illustration of a vehicle energy management system according to an example embodiment.

In order to describe the vehicle energy management system 100 in further detail, reference is made to FIG. 2 which is a schematic illustration of vehicle energy management system 100 according to an example embodiment.

As can be seen, the vehicle energy management system 100 comprises an air compressor 106, a valve arrangement 150 and a heat receiving structure 200. The air compressor 106 and the valve arrangement 150 are arranged in fluid communication with each other. More particularly, the air compressor 106 is arranged to receive ambient air via an air inlet conduit 111 and pressurize the air before delivery towards the valve arrangement 150 via an air outlet conduit 111'. The valve arrangement 150 is arranged to controllably deliver the pressurized flow of air from the air compressor 106 to the ambient environment 160 via a first conduit 113 and/or to the heat receiving structure 200 via a second conduit 112. The heat receiving structure 200 is thus arranged downstream the valve arrangement 150.

As can be seen, the control unit 114 is connected to the air compressor 106, the valve arrangement 150 and the heat receiving structure 200. Although not depicted, the heat receiving structure 200 may comprise a temperature sensor configured to detect a temperature level of the heat receiving structure 200. In such a case, the temperature sensor is connected to the control unit 114 for transmitting a signal indicative of the temperature of the heat receiving structure 200.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

The heat receiving structure 200 is a component of the vehicle that desires a certain temperature for optimal operation, or for keeping transport material at a certain desired temperature level. Various non-limiting examples of specific types of heat receiving structures 200 are described above.

During operation, the air compressor 106 receives ambient air via the air inlet conduit 111. The ambient air is pressurized by the air compressor 106 and exhausted from the air compressor 106 into the air outlet conduit 111'. When the ambient air is pressurized by the air compressor 106, the temperature level of the ambient air is also increased. Hence, the pressurized air exhausted into the air outlet conduit 111' has a higher temperature level compared to the ambient air supplied to the air compressor 106 through the air inlet conduit 111. The air compressor 106 is preferably controlled by dissipating electric energy. In further detail, the air compressor 106 is a power consumer which is operated by electric power, either directly or via an electric machine (see example embodiment depicted in FIG. 4) controlling rotation of the air compressor via e.g. a mechanical shaft. As will be evident from the below description, the air compressor 106 can be operated during a vehicle braking mode, in which the air compressor 106 is operated by receiving electric power during e.g. a regenerative braking operation of the vehicle 10. The air compressor 106 can also receive electric power directly from a battery. The vehicle energy management system 100 may also, although not depicted in the figures, comprise a heat exchanger between the valve arrangement 150 and the heat receiving structure 200, i.e. in the second conduit 112. The air is thus entering such heat exchanger before entering the heat receiving structure 200. The energy management system 100 may also comprise an oil system connected to such a heat exchanger in order to improve other functionalities, such as cold start problematics, etc.

The following will now describe control functionalities of the vehicle energy management system 100 for the FIG. 2 example embodiment. For simplifying the reading of the control functionalities, the heat receiving structure 200 in FIG. 2 will be referred to as a trailer body 202. It should however be readily understood that the following disclosure is equally applicable for other types of heat receiving structures as well.

During operation, the control unit 114 receive a signal from the trailer body 202. The signal received from the trailer body is indicative of current temperature level of the trailer body 202. The control unit 114 compares the temperature level with a predetermined temperature range. A lower limit of the predetermined temperature range is a minimum temperature acceptable for the trailer body 202. For example, in order to avoid that the material or goods in the trailer body freezes, the temperature level of the trailer body 202 should be above the lower limit. A maximum limit of the predetermined temperature range is a maximum temperature acceptable for the trailer body 202. For example, the temperature level of the trailer body should not exceed the maximum to avoid high temperature damage of the material or goods in the trailer body 202. It should thus be readily understood that the predetermined temperature range is a dynamic range which is dependent on e.g. the specific type of heat receiving structure 200 and/or the specific material or goods present in the heat receiving structure 200.

If the vehicle 10 is operated in the vehicle braking mode and the temperature level of the trailer body 202 is below the maximum limit of the predetermined temperature range, the control unit 114 controls the air compressor 106 to operate and pressurize the flow of ambient air received from the air inlet conduit 111. The pressurized, and heated flow of air is supplied towards the valve arrangement 150. The control unit 114 further controls the valve arrangement to direct the flow of pressurized and heated air to the trailer body 202.

During the vehicle braking mode, the air compressor 106 is operated by means of electric power generated during this operating mode. Thus, the vehicle energy management system 100 dissipates electric power which is used for heating the trailer body 202. Accordingly, when the vehicle is operated in the vehicle braking mode, the trailer body is heated as much as possible. However, should the temperature level of the trailer body 202 exceed the maximum limit of the predetermined temperature range, the control unit 114 controls the valve arrangement 150 to direct the flow of pressurized and heated air to the ambient environment 113 via the first conduit 113 in order to avoid overheating of the trailer body 202.

If the vehicle is operated in the non-vehicle braking mode, and the temperature level if the trailer body 202 is below the minimum limit of the predetermined temperature range, the control unit 114 controls the air compressor 106 to pressurize and heat ambient air received through the air inlet conduit 111. The control unit 114 also controls the valve arrangement 150 to direct the flow of pressurized and heated air to the trailer body 202 via the second conduit 112. In such a situation, the air compressor 106 is operated by means of receiving electric power from an electric power source (not shown) such as e.g. a battery or a fuel cell arrangement. Thus, the electric power source is at least partly drained from electric power, and the trailer body 202 is only heated to such an extent that the temperature level exceeds the lower limit of the predetermined threshold, thereby avoiding material or goods in the trailer body 202 freezes.

In order to heat "as little as possible" when the vehicle is operated in the vehicle non-braking mode and the temperature level of the trailer body 202 is below the lower limit of the predetermined temperature range, the control unit 114 controls the air compressor 106 based on a difference between the temperature level of the trailer body 202 and the lower limit of the predetermined temperature range. As a comparison, when the vehicle is operated in the vehicle braking mode, the control unit 114 controls the air compressor based on the available electric power generated during the vehicle braking mode. Thus, the air compressor 106 is controlled in different manners based on the current operating mode of the vehicle 10.

Furthermore, when the vehicle is operated in the vehicle non-braking mode and the temperature level of the trailer body 202 is above the lower limit of the predetermined temperature range, the control unit 114 inhibits operation of the air compressor 106. Thus, the control unit 114 turns off the air compressor 106.

Still further, the control unit 114 may, as an alternative, receive an operator based signal. The operator based signal is received from an operator pushing a button or equivalent. When the control unit 114 receives the operator based signal and the vehicle is operated in the non-vehicle braking mode, the control unit 114 inhibits operation of the air compressor 106.

There may be an exceptional case where the vehicle needs to execute an emergency brake operation. In such a case, and in the unlikely event the valve arrangement 150 for some reason is malfunctioning and not able to direct the pressurized and heat air from the air compressor 106, the pressurized and heated air is allowed to be directed to the trailer body 202 even if the temperature level is above the maximum limit of the predetermined temperature range. This exceptional case is only applicable for a short period of time, and the vehicle should in such a case also use the vehicle service brake to stop the vehicle.

Figure 3:
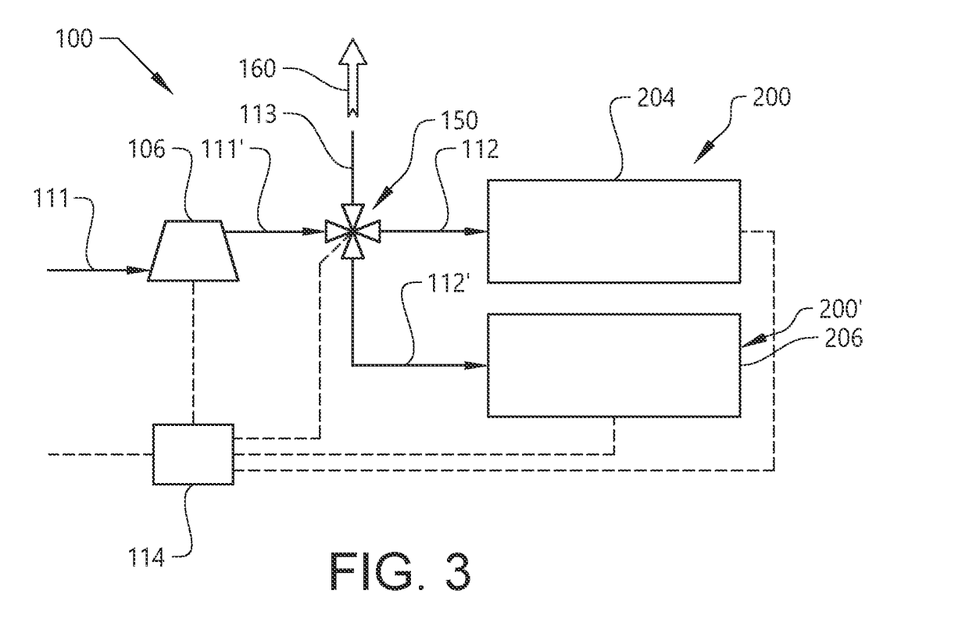
FIG. 3 is schematic illustration of a vehicle energy management system according to another example embodiment.

In order to describe another example embodiment of the vehicle energy management system 100, reference is now made to FIG. 3. The FIG. 3 embodiment comprises similar features as the embodiment described above in relation to FIG. 2. Similar features will thus not be described in detail in relation to FIG. 3.

As can be seen in FIG. 3, the exemplified vehicle energy management system 100 comprises a first heat receiving structure 200 and a second heat receiving structure 200'. The first heat receiving structure 200 is arranged in a similar manner as the heat receiving structure 200 described above in relation to FIG. 2, i.e. arranged in downstream fluid communication with the valve arrangement 150 via the second conduit 112. The second heat receiving structure 200' is arranged in downstream fluid communication with the valve arrangement 150 via a third conduit 112'. The first 200 and second 200' heat receiving structures are preferably, and as indicated in FIG. 3, arranged parallel with each other.

The valve arrangement 150 in FIG. 3 is hereby arranged to controllably direct a flow of pressurized and heated air from the air compressor to the first 200 and/or the second 200' heat receiving structures. The following will describe the operational functionality of the vehicle energy management system 100 depicted in FIG. 3. The first heat receiving structure 200 will in the following be referred to as a fuel cell housing 204 comprising a fuel cell system arranged to generate electric power. The second heat receiving structure 200' will in the following be referred to as a battery 206.

During operation, the control unit 114 receives a signal indicative of a temperature level of the fuel cell housing 204 in a similar vein as described above in relation to the FIG. 2 embodiment. The control unit 114 also determines a first desired temperature level of the fuel cell housing 204. The first desired temperature level may be a first predetermined temperature range, where the temperature level of the fuel cell housing 204 should preferably be within the first predetermined temperature range between a first lower temperature limit and a first maximum temperature limit. The control unit 114 determines a first temperature deviation of the fuel cell housing 204. The first temperature deviation is a difference between the current temperature level of the fuel cell housing 204 and the first desired temperature level.

The control unit 114 is also configured to receive a signal indicative of a temperature level of the battery 206. A second desired temperature level of the battery 206 is also determined. The second desired temperature level may be a second predetermined temperature range, where the temperature level of the battery 206 should be within the second predetermined temperature range, between a second lower temperature limit and a second maximum temperature limit. In a similar vein as for the fuel cell housing 204, the control unit 114 is configured to determine a second temperature deviation of the battery, i.e. a difference between the current temperature level of the battery 206 and the second desired temperature level.

The control unit 114 thereafter compares the first temperature deviation and the second temperature deviation with each other. Based on the comparison, the control unit 114 controls the valve arrangement 150 to direct the flow of pressurized and heated air from the air compressor 106 to the fuel cell housing 204 and/or to the battery 206. Preferably, if the valve arrangement 150 is controlled to direct the flow of pressurized and heated air to the fuel cell housing 204 when the first temperature deviation is larger than the second temperature deviation. When the second temperature deviation is larger than the first temperature deviation, the valve arrangement 150 is on the other hand controlled to direct the flow of pressurized and heated air to the battery.

It should be understood that the valve arrangement 150 is also arranged to be able to direct a portion of the pressurized and heated air from the air compressor 106 to the fuel cell housing 204, and another portion to the battery 206. The ratio of delivery to either the fuel cell housing 204 or the battery 206 is dependent on the temperature level of the respective component and whether the vehicle is operated in the vehicle braking mode or the vehicle non-braking mode. Thus, the ratio is dependent on the available heated air.

According to an example, the control unit 114 is also configured to receive a signal indicative of an air flow temperature of the flow of pressurized air supplied from the air compressor at a position upstream the valve arrangement 150. The air flow temperature may, for example, be received from a temperature sensor (not shown) arranged in the air outlet conduit 111'. Based on the air flow temperature of the flow of pressurized air, the control unit 114 controls the valve arrangement 150 to direct the flow of pressurized and heated air to the fuel cell housing 204 and/or the battery 206.

Furthermore, it should be readily understood that the vehicle energy management system 100 in FIG. 3 is operable in a similar vein as the vehicle energy management system 100 in FIG. 2 in relation to the vehicle being operated in the vehicle braking mode or the vehicle non-braking mode. In detail, when the vehicle 10 is operated in the vehicle braking mode, the control unit 114 controls the air compressor 106 and the valve arrangement such that the fuel cell housing 204 and/or the battery 206 are heated as much as possible, while still maintaining the desired brake power, with the prioritizations described above, without exceeding their respective maximum temperature limits. Thus, the "free energy" obtained during the vehicle braking mode is used. When the vehicle 10 is operated in the non-braking mode, the control unit 114 controls the air compressor 106 and the valve arrangement 150 such that the fuel cell housing 204 and/or the battery 206 are heated as little as possible, with the prioritizations described above, without the temperature level of the fuel cell housing 204 and the battery 206 falls below their respective lower temperature limits. The valve arrangement 150 is thus obviously also arranged to control the flow of pressurized and heated air from the air compressor 106 to be directed to the ambient environment when the temperature level of the fuel cell housing 204 and the temperature level of the battery 206 exceeds their respective maximum temperature limit.

Although FIG. 2 depicts a single heat receiving structure 200 and FIG. 3 illustrates two heat receiving structures, the present invention is applicable for vehicle energy management systems comprising even further heat receiving structures, either arranged in parallel with each other, or arranged in series with each other.

Figure 4:
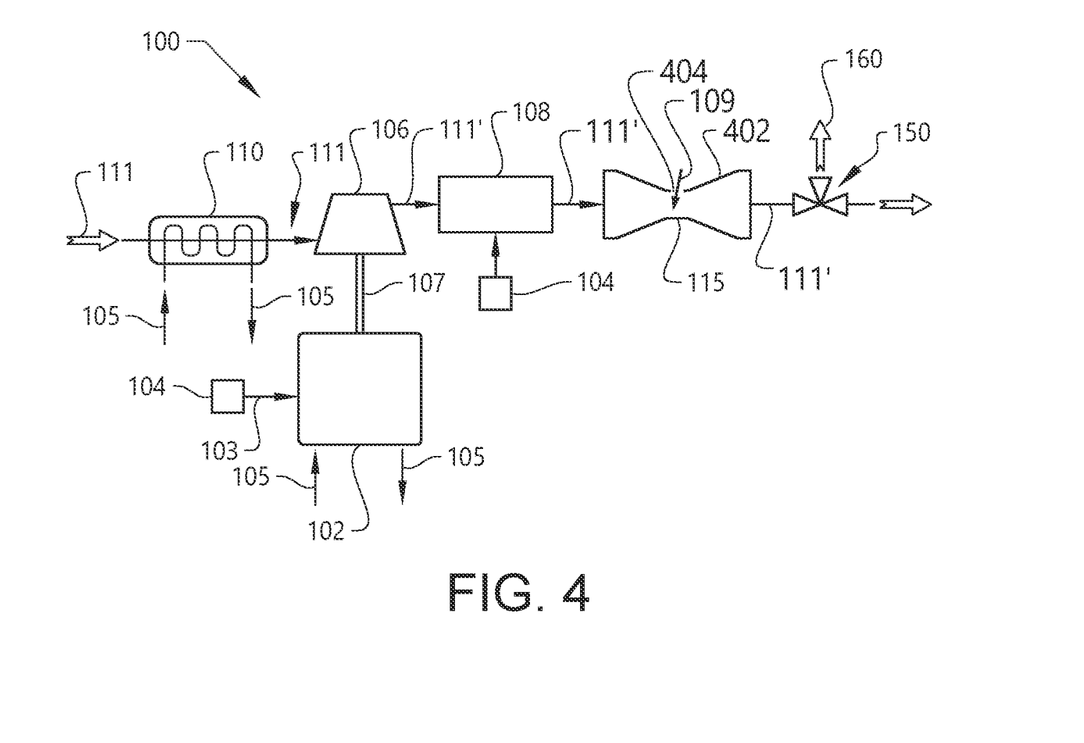
FIG. 4 is schematic illustration of a vehicle energy management system according to a still further example embodiment.

Reference is now made to FIG. 4 in order to describe yet another example embodiment of the vehicle energy management system 100. The embodiment in FIG. 4 only describes the components arranged upstream the valve arrangement 150. The functional operation of the vehicle energy management system 100 in FIG. 4 is thus the same as described above in relation to FIGS. 2 and 3. The control unit 114 is omitted from FIG. 4 and the following description but should be construed as also incorporated in this example embodiment.

As can be seen in FIG. 4, the vehicle energy management 100 comprises an electric machine 102 arranged to receive electric power 103 from an electric source 104. The electric source 104 can be, for example, a vehicle battery or a fuel cell system. The electric source 104 can, as another option, be formed by an electric inverter, or other electric machine, etc. Thus, the purpose of the electric source is to supply electric power to the electric machine. The electric source can, according to an example, also be arranged to receive electric power from the traction motor 101 of the vehicle. Moreover, the electric machine 102 can also be connected to a cooling system 105 of the vehicle 10. The cooling system 105 may either be a liquid cooling system or an air cooling system.

The vehicle energy management system 100 further comprises the above described air compressor 106, which here is mechanically connected to, and operated by, the electric machine 102. Preferably, the air compressor 106 is mechanically connected to the electric machine 102 by a shaft 107.

The energy management system 100 further comprises an air heating arrangement 108, 110. In FIG. 4, the air heating arrangement 108, 110 is illustrated and described as an electric air heating arrangement 108 and a heat exchanger 110. It should however be readily understood that the energy management system 100 may comprise only one of the electric air heating arrangement 108 and the heat exchanger 110. Thus, one of the electric air heating arrangement 108 and the heat exchanger 110 can be omitted in the energy management system 100 but are both illustrated for simplifying the description of the present embodiment.

The electric air heating arrangement 108 may be arranged in the air outlet conduit 111' at a position downstream the air compressor 106, i.e. for receiving pressurized air from the air compressor 106. The electric air heating arrangement 108 is connected to the electric source 104. In FIG. 4, the electric source 104 is depicted as two components for simplicity of understanding. It should be readily understood that the electric source could be either a single component or separate components.

The electric air heating arrangement 108 is preferably implemented in the form of an electric brake resistor arrangement comprising an electric brake resistor. The electric air heating arrangement 108 thus receives the pressurized air from the air compressor 106, whereby the air is heated in the electric air heating arrangement by the electric power received from the electric source 104. The air is thereafter preferably supplied towards the valve arrangement 150.

According to an example embodiment, the electric air heating arrangement may be an air cooled electric air heating arrangement, such as an air cooled electrical brake resistor. The electric air heating arrangement is thus cooled by the air it receives from the air flow producing unit when receiving electric power. Other alternatives are also conceivable.

Further, the heat exchanger 110 is arranged in upstream fluid communication with the air compressor 106 in the air inlet conduit 111. The heat exchanger 110 is in FIG. 4 arranged as a heat exchanger connected to the cooling system 105 of the vehicle 10. Thus, the heat exchanger receives liquid fluid from the cooling system 105 and pre-heats the air before it is delivered to the air compressor 106. The heat exchanger 110 is thus preferably an air-to-liquid heat exchanger but may, as an alternative, be an air-to-air heat exchanger which uses relatively warm air to heat the air that is supplied to the air compressor 106. As a not depicted alternative, the heat exchanger 110 may be replaced by the electric machine 102. In such a case, the electric machine receives the air, and pre-heats the air before the air is supplied to the air compressor 106. The heat exchanger 110 may also be arranged at other positions of the vehicle energy management system 100 than what is depicted in FIG. 4. For example, the heat exchanger 110 may be in air outlet conduit 111' downstream the air compressor 106.

Furthermore, the energy management system 100 comprises a flow injecting arrangement 402 positioned in the air outlet conduit 111'. The flow injecting arrangement 402 is arranged in downstream fluid communication with the air compressor 106, i.e. the flow injecting arrangement 402 receives the pressurized air exhausted from the air compressor 106. Although not depicted in detail in FIG. 4, the flow injecting arrangement 402 comprises a portion configured to admit a flow of fluid into the flow of air exhausted from the air compressor 106. As can be seen in FIG. 4, the flow injecting arrangement 402 is arranged in the form of a venturi arrangement comprising a constricted portion 115. The constricted portion 115 is arranged as a reduced diameter of the venturi arrangement in which the flow velocity of the flow of air from the air compressor 106 will increase. The portion configured to admit the flow of fluid into the venturi arrangement is preferably arranged at the constricted portion 115 of the venturi arrangement. As can be seen in FIG. 4, the portion is arranged as an orifice 404 in which a flow of fluid 109 can enter the constricted portion 115. According to the example embodiment depicted in FIG. 4, the venturi arrangement 402 is arranged in downstream fluid communication with the electric air heating arrangement 108. It should however be readily understood that the venturi arrangement 402 is arranged in upstream fluid communication with the electric air heating arrangement 108, i.e. between the air compressor 106 and the electric air heating arrangement 108.

Although not illustrated in the figures, the vehicle energy management system 100 may comprise further features, such as a flow restriction arrangement positioned in the air outlet conduit 111'. Such flow restriction arrangement can advantageously increase the pressure level of the flow of air in the air outlet conduit 111'. The flow restriction arrangement is preferably arranged downstream the air compressor 106. The vehicle energy management system 100 may also comprise a muffler in the air outlet conduit 111' at a position between the air compressor 106 and the valve arrangement 150.

Figure 5:
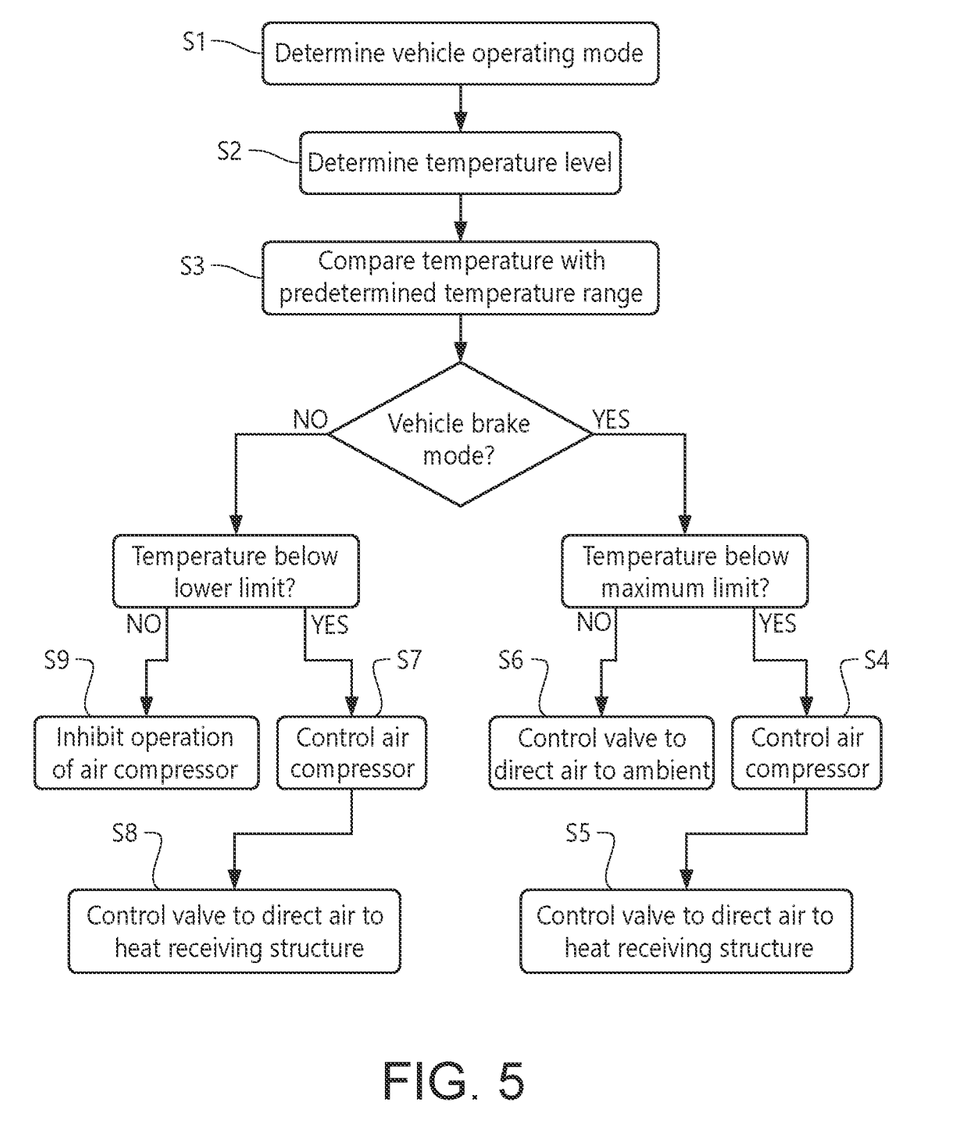
FIG. 5 is a flow chart of a method of controlling the energy management system according to an example embodiment.

In order to sum up, reference is made to FIG. 5 which is a flow chart of a method of controlling the above described vehicle energy management system 100 according to an example embodiment.

As an initial stage, the current vehicle operating mode for the vehicle is determined S1. Also, the temperature level of the heat receiving structure 200 is determined S2, and the temperature level is compared S3 to a predetermined temperature range.

If the vehicle is operated in the vehicle braking mode, and the temperature level of the heat receiving structure 200 is below the maximum limit of the temperature range, the air compressor is controlled S4 to supply a flow of pressurized air towards the valve arrangement 150. The power level of the air compressor is controlled based on the desired braking. The valve arrangement 150 is controlled S5 to direct the flow of pressurized air to the heat receiving structure 200.

On the other hand, if the vehicle 10 is operated in the vehicle braking mode and the temperature level of the heat receiving structure 200 is above the maximum limit of the predetermined temperature range, the valve arrangement 150 is controlled S6 to direct the flow of pressurized air to the ambient environment 160.

If the vehicle 10 is not operated in the vehicle braking mode, i.e. the vehicle 10 is operated in the vehicle non-braking mode and the temperature level of the heat receiving structure 200 is below the lower limit of the predetermined temperature range, the air compressor 106 is controlled S7 to supply a flow of pressurized air towards the valve arrangement 150. The valve arrangement 150 is controlled S8 to direct the flow of pressurized air to the heat receiving structure 200. The power level of the air compressor 106 is here controlled based on the desired temperature increase of the heat receiving structure 200.

On the other hand, if the vehicle 10 is operated in the vehicle non-braking mode and temperature level of the heat receiving structure 200 is above the lower limit of the predetermined temperature range, the air compressor 106 is inhibited S9 from further operation.

It is to be understood that the present disclosure is not limited to the embodiments described above and illustrated in the drawings; rather, the skilled person will recognize that many changes and modifications may be made within the scope of the appended claims.

The invention claimed is:

1. A vehicle energy management system connectable to a vehicle, the energy management system comprising:
 a heat receiving structure susceptible to a flow of pressurized air;
 an air compressor, arranged in fluid communication with an ambient environment via a first conduit, and in fluid communication with the heat receiving structure via a second conduit;
 a valve arrangement arranged in downstream fluid communication with the air compressor, the valve arrangement being configured to controllably deliver a flow of pressurized air from the air compressor to the ambient environment via the first conduit and/or to the heat receiving structure via the second conduit; and
 a control unit connected to the air compressor and the valve arrangement, the control unit comprising control circuitry configured to:
  receive a signal indicative of a current vehicle operating mode for the vehicle, the vehicle operating mode being one of a vehicle braking mode in which the vehicle is controlled not to exceed a desired vehicle speed, and a vehicle non-braking mode;
  receive a signal indicative of a temperature level of the heat receiving structure;
  compare the temperature level with a predetermined temperature range; and
  when the vehicle is operated in the vehicle braking mode and the temperature level is below a maximum limit of the predetermined temperature range:
   control the air compressor to supply the flow of pressurized air towards the valve arrangement; and
   control the valve arrangement to deliver the flow of pressurized air to the heat receiving structure via the second conduit.

2. The vehicle energy management system of claim 1, wherein the control circuitry is further configured to:
 control the valve arrangement to deliver the flow of pressurized air to the ambient environment via the first conduit when the vehicle is operated in the vehicle braking mode and the temperature level is above the maximum limit of the predetermined temperature range.

3. The vehicle energy management system of claim 1, wherein when the vehicle is operated in the vehicle non-braking mode and the temperature level is below a lower limit of the predetermined temperature range, the control circuitry is further configured to:
 control the air compressor to supply the flow of pressurized air towards the valve arrangement; and
 control the valve arrangement to deliver the flow of pressurized air to the heat receiving structure.

4. The vehicle energy management system of claim 3, wherein the air compressor is controlled based on a difference between the temperature level of the heat receiving structure and the lower limit of the predetermined temperature range, when the vehicle is operated in the vehicle non-braking mode and the temperature level is below the lower limit of the predetermined temperature range.

5. The vehicle energy management system of claim 3, wherein the control circuitry is further configured to:
 inhibit operation of the air compressor when the vehicle is operated in the vehicle non-braking mode and the temperature level exceeds the lower limit of the predetermined temperature range.

6. The vehicle energy management system of claim 1, wherein the control circuitry is further configured to:
 receive an operator-based signal indicative of non-heating operation of the heat receiving structure; and
 upon receiving said operator-based signal:
  inhibit operation of the air compressor when the vehicle is operated in the vehicle non-braking mode.

7. The vehicle energy management system of claim 1, wherein the heat receiving structure is a first heat receiving structure, the energy management system further comprising a second heat receiving structure different from the first heat receiving structure, the second heat receiving structure being arranged in downstream fluid communication with the valve arrangement via a third conduit.

8. The vehicle energy management system of claim 7, wherein the control circuitry is further configured to:
 determine a first desired temperature level of the first heat receiving structure;
 determine a first temperature deviation of the first heat receiving structure, the first temperature deviation being indicative of a current temperature level below the first desired temperature level;
 receive a signal indicative of a temperature level of the second heat receiving structure;
 determine a second desired temperature level of the second heat receiving structure;
 determine a second temperature deviation of the second heat receiving structure, the second temperature deviation being indicative of a current temperature level below the second desired temperature level;
 compare the first temperature deviation with the second temperature deviation;
 control the valve arrangement to direct the flow of pressurized air to the first heat receiving structure when the first temperature deviation is larger than the second temperature deviation, and
 control the valve arrangement to direct the flow of pressurized air to the second heat receiving structure when the second temperature deviation is larger than the first temperature deviation.

9. The vehicle energy management system of claim 7, wherein the control circuitry is further configured to:
 receive a signal indicative of an air flow temperature of the flow of pressurized air supplied from the air compressor at a position upstream the valve arrangement; and
 control the valve arrangement to direct the flow of pressurized air to the first heat receiving structure or to the second heat receiving structure based on the air flow temperature of the flow of pressurized air, the temperature level of the first heat receiving structure, and the temperature level of the second heat receiving structure.

10. The vehicle energy management system of claim 1, further comprising an electric machine connected to an electric source.

11. The vehicle energy management system of claim 1, further comprising an air heating arrangement in fluid communication between the air compressor and the valve arrangement.

12. A vehicle comprising the vehicle energy management system of claim 1.

13. A method of controlling a vehicle energy management system connected to a vehicle, the vehicle management system comprising:
- a heat receiving structure susceptible to a flow of pressurized air;
- an air compressor, arranged in fluid communication with an ambient environment via a first conduit, and in fluid communication with the heat receiving structure via a second conduit; and
- a valve arrangement arranged in downstream fluid communication with the air compressor, the valve arrangement being configured to controllably deliver a flow of pressurized air from the air compressor to the ambient environment via the first conduit and/or to the heat receiving structure via the second conduit;

wherein the method comprises:
- determining a current vehicle operating mode for the vehicle, the vehicle operating mode being one of a vehicle braking mode in which the vehicle is controlled not to exceed a desired vehicle speed, and a vehicle non-braking mode;
- determining a temperature level of the heat receiving structure;
- comparing the temperature level with a predetermined temperature range; and
- when the vehicle is operated in the vehicle braking mode and the temperature level is below a maximum limit of the predetermined temperature range:
- controlling the air compressor to supply the flow of pressurized air towards the valve arrangement; and
- controlling the valve arrangement to deliver the flow of pressurized air to the heat receiving structure via the second conduit.

14. A computer program comprising program code means for performing the steps of claim 13 when the program code means is run on a computer.

15. A computer readable medium carrying a computer program means for performing the steps of claim 13 when the computer program means is run on a computer.

* * * * *